June 2, 1931.  H. G. REIST  1,808,572
ROTOR FOR DYNAMO ELECTRIC MACHINES
Filed Dec. 22, 1928
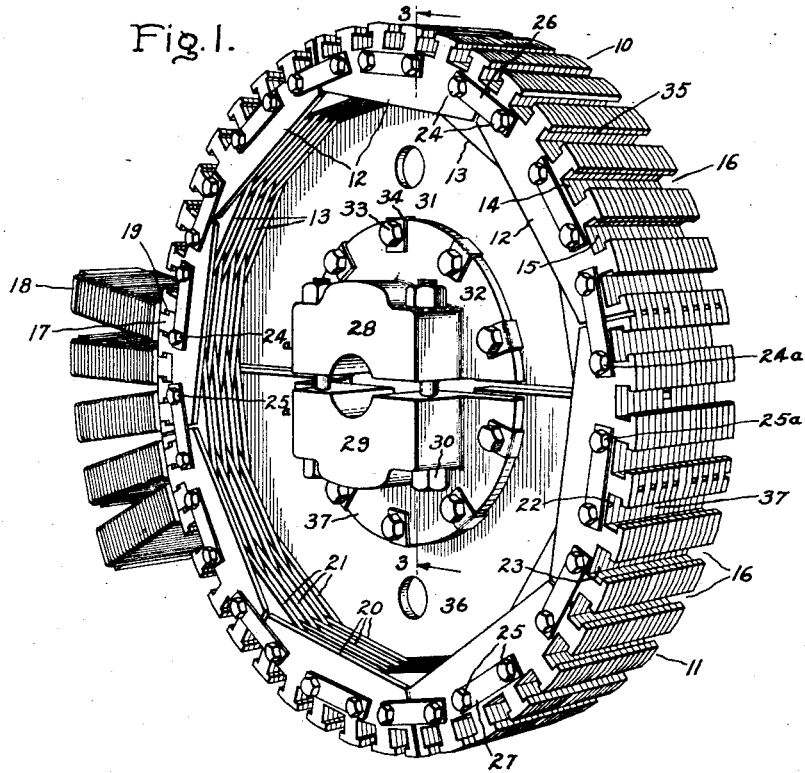
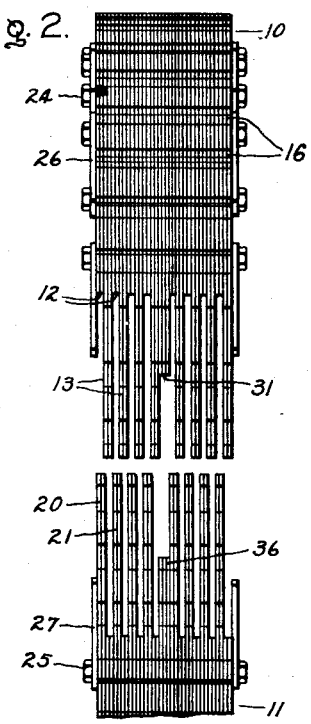
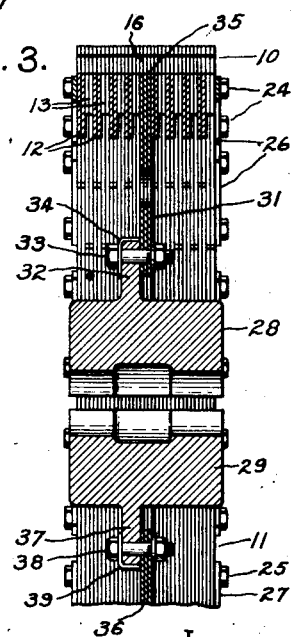
Inventor
Henry G. Reist,
by Charles E. Mullan
His Attorney.

Patented June 2, 1931

1,808,572

UNITED STATES PATENT OFFICE

HENRY G. REIST, OF SCHENECTADY, NEW YORK, ASSIGNOR TO GENERAL ELECTRIC COMPANY, A CORPORATION OF NEW YORK

ROTOR FOR DYNAMO ELECTRIC MACHINES

Application filed December 22, 1928. Serial No. 327,817.

My invention relates to rotors for dynamo electric machines.

It has been the practice, heretofore, to construct rotors for dynamo electric machines by providing a cast central supporting structure or spider to which the pole pieces of the rotor were attached. When it has been desired to make the rotor separable in two or more parts for the purpose of facilitating shipment thereof, it has been necessary to machine the parts of the rotor to provide a suitable joint for connecting them together in assembling the same. This rotor construction has been subject to the disadvantages that the spider casting was very heavy because the cast material was not uniform in strength which necessitated designing the sections thereof for the minimum strength of the material employed; that the spider involved considerable expensive machine work, and that the spider was not uniform in magnetic properties so that it was necessary to provide a comparatively large cross-section of the magnetic path in the spider to insure magnetic paths between the pole pieces of the desired reluctance.

The object of my invention is to provide a rotor construction, which is separable in two or more sectors to facilitate shipment thereof and which can be readily built up of a plurality of plates of material such as sheet steel, for example, so that the spider will be light in weight, require little or no machine work and be entirely uniform in its magnetic properties. I do this by providing a rotor comprising separable sectors having pole pieces secured thereto, each sector including staggered plates which are interleaved with plates of the adjacent sector to form a joint therewith, and providing an arrangement for securing the plates together.

My invention will be more fully set forth in the following description referring to the accompanying drawings and the features of novelty which characterize my invention will be pointed out with particularity in the claims annexed to and forming a part of this specification:—

In the drawings Fig. 1 is a perspective view of a rotor embodying my invention, the groups of plates constituting the central supporting structure or spider of the rotor being shown only in outline on account of the small scale thereof; Fig. 2 is a side elevation of the sectors constituting the rotor construction showing the interleaved plates forming a joint between them separated, and Fig. 3 is a fragmentary axial section of the rotor on the line 3—3 of Fig. 1.

Referring to the drawings the rotor construction which I have illustrated as an example of one manner of carrying out my invention comprises a central supporting structure or spider having pole pieces secured to the outer periphery thereof. The central supporting structure or spider comprises separable sectors 10 and 11. The sector 10 is formed of a plurality of groups of plates 12 which are staggered with respect to another group of plates 13, the groups of plates 12 and 13 being arranged about the periphery of the sector with their edges presented radially outward and with their ends in substantial alignment with each other to form a continuous sector. The groups of plates 12 and 13 are provided with dovetailed notches 14 and 15 which are aligned axially of the rotor to form dovetailed grooves 16 about the periphery thereof, in which the dovetailed portion 17 of the pole pieces 18 are secured by keys 19 as shown in Fig. 1. The sector 11 is also formed of groups of plates 20 arranged about the periphery of the sector with their edges presented radially outward thereof and in staggered relation to another group of similarly arranged plates 21, the groups of plates 20 and 21 being provided with dovetailed notches 22 and 23 which are also aligned axially of the motor to form dovetailed grooves 16, in which the pole pieces 18 are secured. The plates constituting the sectors 10 and 11 may be secured together in any suitable manner, but I prefer to employ bolts 24 and 25 having locking plates 26 and 27 arranged thereon and extending axially of the rotor, as the bolt holes can be readily formed in the plates at the same time the dove-tailed notches are formed therein. Upon removal of bolts 24a and 25a, which are arranged on opposite sides of the joints between the sectors 10 and 11, the sectors can be readily taken apart.

In order to make the entire rotor separable into two parts to facilitate shipment thereof I secure the sectors 10 and 11 to parts 28 and 29 respectively of a suitable hub member which are secured together by bolts 30. The part 28 is secured to the sector 10 by means of a group of plates 31 of semi-circular form which are secured to an integral flange 32 of the part 28 by bolts 33 having lock plates 34 thereon. The plates 31 which extend to the outer periphery of the sector 10, are formed with dovetailed notches 35 aligned with the grooves 16 on the outer periphery of the sector and with bolt holes (not shown) adapted to receive the bolts 25. The sector 11 is secured to the part 29 of the hub member by a group of plates 36 which are secured to an integral flange 37 of the part 29 by bolts 38 having lock plates 39 thereon. The group of plates 36 are also semi-circular in form and extend to the outer periphery of the flange 37. These plates are also provided with dovetailed notches 37 with their outer periphery in alignment with the dovetailed groove 16 and formed with bolt holes (not shown) adapted to receive the bolts 25.

The grooves of plates 13 of the sector 10 are interleaved with the groups of plates 20 of the sector 11 to form a separable joint between the edges of plates 31 and 36 which are adjacent each other substantially on the diameter of the rotor. By this construction when the pole pieces 18 at the joint, the bolts 24a and 25a, and the bolts 30 of the hub member are removed the sectors 10 and 11 can be taken apart, as indicated in Fig. 2, to facilitate shipment of the rotor. The rotor can then be readily reassembled by placing the sectors 10 and 11 together, arranging the bolts 24a and 25a and 30 therein, and replacing the pole pieces 18.

In view of the foregoing it will be apparent that I have produced an improved rotor construction of separable sectors which can be readily built up of plates such as sheet steel so that the construction is light in weight, involves little or no machine work and in which the material is of substantially uniform magnetic properties.

Modifications of the form of the improved rotor which I have disclosed will occur to those skilled in the art, so that I do not desire my invention to be limited to the particular arrangement set forth, but I intend in the appended claims to cover all modifications thereof which do not depart from the spirit and scope of my invention.

What I claim as new and desire to secure by Letters Patent of the United States, is:

1. A rotor for dynamo-electric machines comprising separable sectors, each sector including staggered plates interleaved with the plates of the adjacent sector to form a joint therewith, means for securing said plates together, a hub member having parts corresponding to said sectors, means for securing said sectors to their respective parts of said hub member, and pole pieces carried by said sectors.

2. A rotor for dynamo-electric machines comprising separable sectors, each sector including staggered plates interleaved with the plates of the adjacent sector to form a joint therewith, means for securing said plates together, a hub member, means including plates for securing said sectors to said hub member, and pole pieces carried by said sectors.

3. A rotor for dynamo-electric machines comprising separable sectors, each sector including staggered plates interleaved with the plates of the adjacent sector to form a joint therewith, a hub member having parts corresponding to said sectors, means including plates for securing said sectors to their respective parts of said hub member, and pole pieces carried by said sectors.

4. A rotor for dynamo-electric machines comprising separable sectors, each sector including staggered notched plates, the plates of each sector being arranged so that the notches thereof form grooves extending axially of the rotor and being interleaved with the plates of the adjacent sector to form a joint therewith, means for securing said plates together, a hub member having parts corresponding to said sectors, means including notched plates arranged with the notches thereof in axial alignment with the notches in said sectors for securing said sectors to said hub member, and pole pieces secured in said axial grooves.

5. A rotor for dynamo-electric machines comprising separable sectors, each sector including staggered notched plates, the plates of each sector being arranged so that the notches thereof form grooves extending axially of said rotor and being interleaved with the plates of the adjacent sector to form a joint therewith, means for securing said plates together, a hub member having parts corresponding to said sectors, means including notched plates arranged with the notches thereof in axial alignment with the notches in said sectors for securing said sectors to their respective parts of said hub member, and pole pieces secured in said axial grooves.

In witness whereof, I have hereunto set my hand this 20th day of December, 1928.

HENRY G. REIST.